United States Patent [19]
Nylund et al.

[11] 4,454,093
[45] Jun. 12, 1984

[54] FUEL ASSEMBLY WITH A WATER DISTRIBUTION CHANNEL

[75] Inventors: Olov Nylund; Bengt Ode, both of Västerås, Sweden

[73] Assignee: AB Asea-Atom, Västerås, Sweden

[21] Appl. No.: 315,604

[22] Filed: Oct. 30, 1981

[30] Foreign Application Priority Data

Dec. 19, 1980 [SE] Sweden ............................. 8008986

[51] Int. Cl.³ .............................................. G21C 15/18
[52] U.S. Cl. .................................. 376/282; 376/443; 376/445; 376/448
[58] Field of Search ............... 376/282, 434, 438, 440, 376/443, 444, 445, 448

[56] References Cited

U.S. PATENT DOCUMENTS

| | | | |
|---|---|---|---|
| 3,920,514 | 11/1975 | Calvin | 376/282 |
| 4,123,327 | 10/1978 | Sugisaki et al. | 376/282 |

FOREIGN PATENT DOCUMENTS

| | | | |
|---|---|---|---|
| 52-56298 | 9/1977 | Japan | 376/282 |
| 53-148694 | 12/1978 | Japan | 376/282 |
| 54-38487 | 3/1979 | Japan | 376/444 |

*Primary Examiner*—Sal Cangialosi
*Attorney, Agent, or Firm*—Pollock, Vande Sande & Priddy

[57] ABSTRACT

A fuel assembly which comprises a plurality of subassemblies of fuel rods (12), which are each enclosed in a corresponding wall system (1), is provided at its upper end with a horizontal distribution channel (22, 32), extending along the periphery, which upon emergency cooling receives sprinkling water and distributes this among the different subassemblies.

5 Claims, 9 Drawing Figures

FUEL ASSEMBLY WITH A WATER DISTRIBUTION CHANNEL

TECHNICAL FIELD

The present invention relates to a fuel assembly for a boiling water reactor, the fuel assembly comprising a plurality of vertical fuel rods which are furnished with a fuel channel device and arranged to form a plurality of groups of fuel rods, the groups along a vertical stretch constituting a predominant portion of the length of the fuel rods being each surrounded by a corresponding wall system, the wall systems being constructed in such a way as to prevent, to a substantial extent, a horizontal water transfer between the groups of fuel rods.

BACKGROUND ART

Fuel assemblies of the kind mentioned above are known, for example, from the U.S. Pat. No. 3,164,530 and the U.K. patent application No. 2,054,247 A.

With fuel asssemblies of this kind, it is necessary to ensure that sprinkling water is evenly supplied to all groups of fuel rods in the assembly upon an emergency cooling, even if the location of the fuel assembly in relation to the nozzles of the sprinkling system results in a considerable variation from group to group of the amount of sprinkling water supplied directly from the nozzles.

A fuel assembly according to the invention is particularly advantageous in such cases where a fuel assembly of the design described in the introduction, that is, a fuel assembly with a plurality of subassemblies or groups, is used in a reactor having a sprinkling system for emergency cooling of the core is constructed fuel assemblies not divided into subassemblies.

DISCLOSURE OF THE INVENTION

According to the invention, a fuel assembly comprises a fuel channel having a portion, located above the fuel rods, the horizontal projection of which surrounds all the fuel rods in the fuel assembly, the fuel channel portion being provided with a substantially horizontal water distribution channel extending along the inner side of the fuel channel portion, said distribution channel is arranged to receive emergency cooling water supplied to the fuel assembly from a location vertically above at least one of the fuel rod subassemblies and to supply received emergency cooling water to at least one of the other fuel rod subassemblies.

BRIEF DESCRIPTION OF DRAWINGS

In the following the invention will be described with reference to the accompanying schematic drawings, in which

FIGS. 1 and 2 show in extremely simplified form a view from above and a lateral view, respectively, of a portion of a reactor core in which at least some of the fuel assemblies are constructed according to the invention and in which the sprinkling nozzles are so thinly scattered that the emergency cooling water would have become very unevenly distributed among the different partial fuel assemblies in a fuel assembly if the fuel assembly were not provided with a water distribution device.

FIG. 3 shows a fuel assembly according to the invention in vertical section along III—III in FIG. 4, which shows a section along IV—IV in FIG. 3.

FIG. 5 shows the same fuel assembly in section and view along V—V in FIG. 6, and FIG. 6 shows an upper part of the fuel assembly in section along VI—VI in FIG. 5.

FIG. 7 shows a section along VII—VII in FIG. 3.

DESCRIPTION OF PREFERRED EMBODIMENTS

Figure 1:
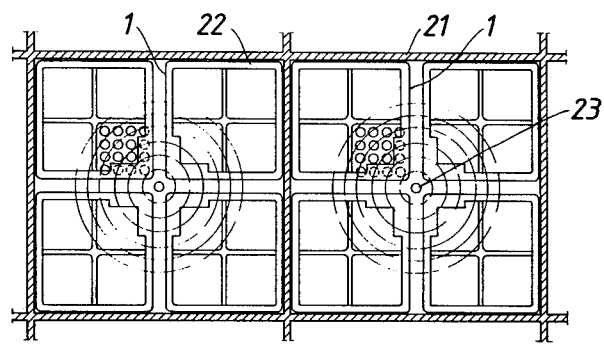
FIGS. 1-7 show a first and FIGS. 8 and 9 a second embodiment.

The fuel assembly shown in the drawings has a vertical longitudinal axis and comprises 64 fuel rods 12, which are distributed among four different subassemblies. Each subassembly is surrounded by a wall system such as a substantially quadratic fuel channel 1. Each fuel channel 1 contains a plurality of spacers, not shown in the drawings, as well as one bottom plate 2, which supports the fuel rods of the subassembly. Each bottom plate 2 rests on a bottom frame 3, which is welded to a corresponding fuel channel 1 and which is constructed with a circular cylindrical inner surface. The four bottom frames 3 are supported by a distribution block 4, which is constructed with four hollow cylindrical outlet nozzles 5, each of the four bottom frames 3 surrounding one outlet nozzle with no mentionable play and being attached to the outlet nozzles by means of radially directed pins 6. Each outlet nozzle 5 is hydraulically connected, via an individual throttling channel 7, to a base 8 welded to the distribution block 4.

External wall surfaces of the fuel channels 1 define a vertical water channel 10 of cruciform cross-section, whereby each channel arm to a greater or smaller extent, is open in a radial direction. The four fuel channels 1, which each surround a fuel rod bundle, are connected at their upper ends and above the active portion of the core to an upper fuel channel portion 14 made with vertical extension H and arranged to surround all the fuel rods of the fuel assembly. An upper portion of each fuel channel 1 is mechanically connected to a central top tube 11.

Figure 3:
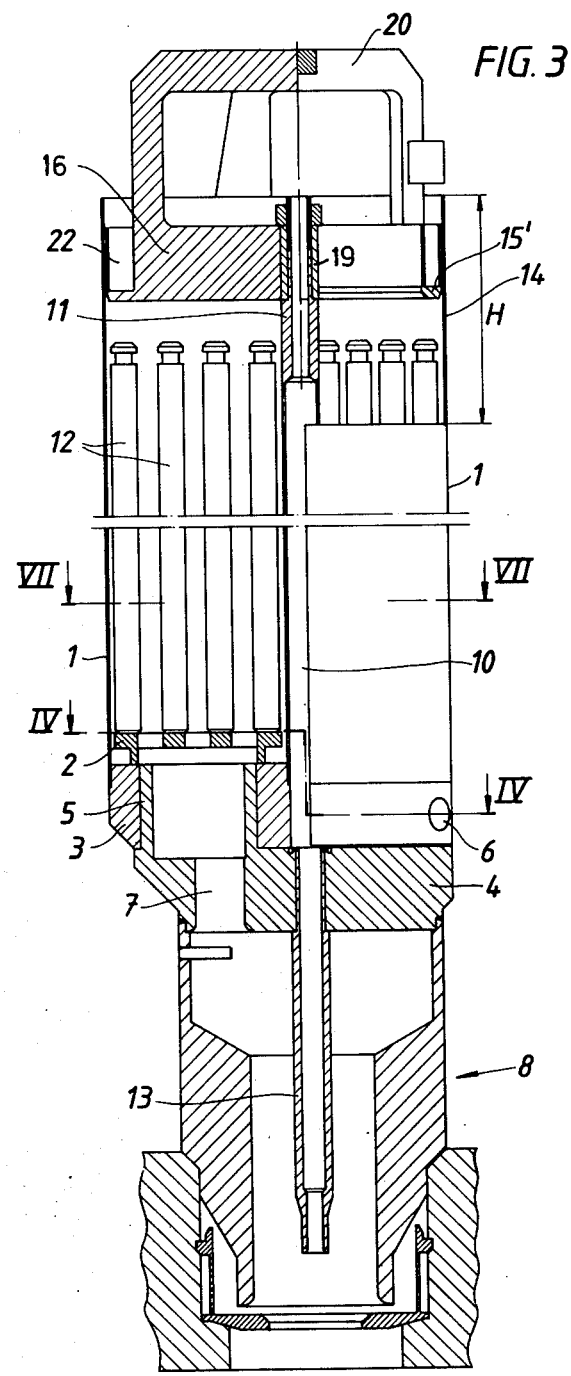
Figure 4:
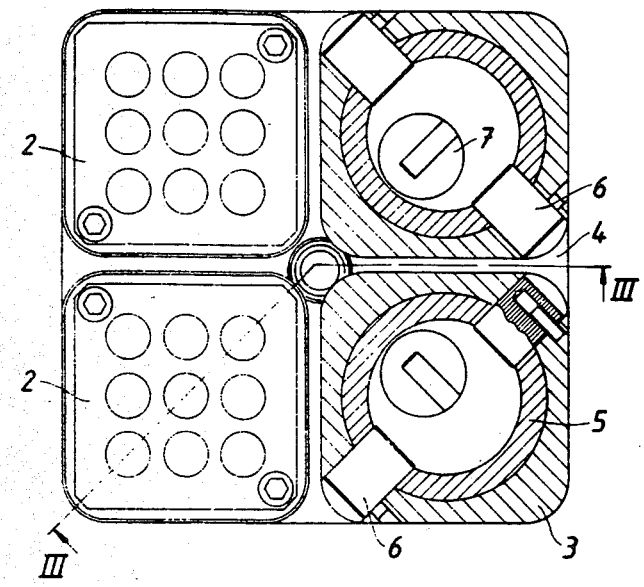
Figure 7:
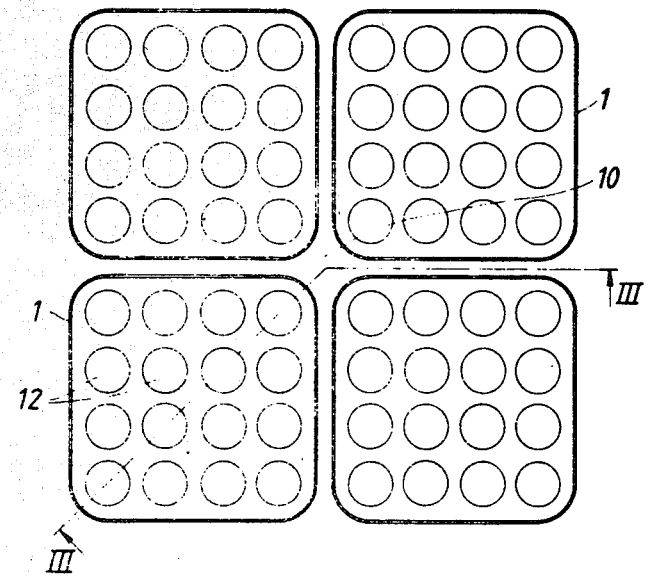
Figure 6:
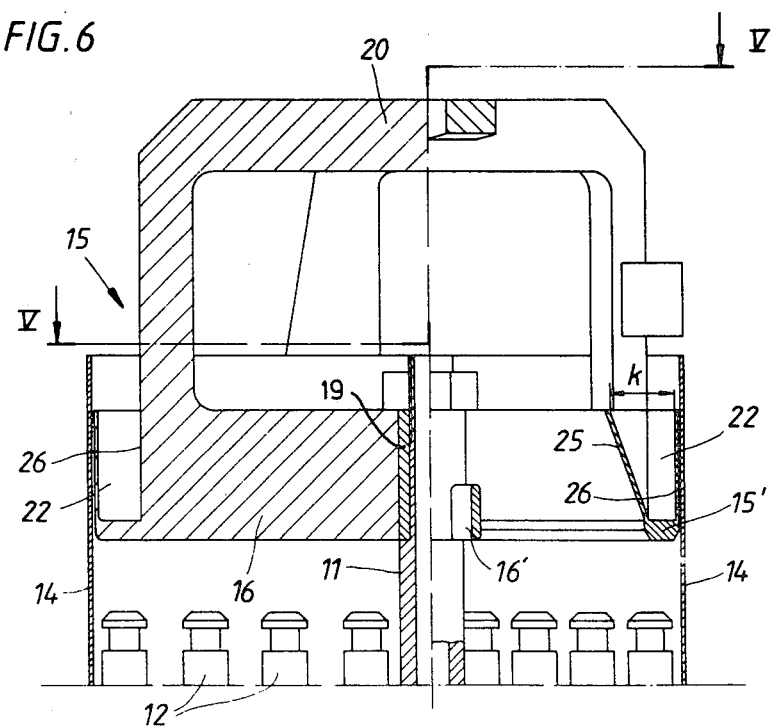

The vertical channel 10 is hydraulically connected to a supply tube 13 at its lower portion. The upper fuel channel portion 14 has a substantially quadratic cross-section and, as shown in FIGS. 3 and 6, surrounds a top plate 15, which is made with a substantially quadratic frame 15', making contact with the inner side of the fuel channel portion 14, and with a plurality of horizontal bars 16 and 16', each of which is attached by one end to the frame 15' and by its other end to a central hollow cylinder 19 surrounding the central tube 11. Two horizontal arms 17 extend from a central portion of each of the bars 16 and 16' and are rigidly mechanically connected to the frame 15' by their outer ends. The freedom of movement of the fuel rods in an axially upward direction is restricted by means of portions of the bars 16 and 16' and of the arms 17 positioned above the fuel rods and by means of a plurality of horizontal projections 18 and 18', respectively, extending from the above-mentioned bars. The bars 16 have a greater cross-section than the bars 16' and are rigidly mechanically connected to a handle 20 for lifting the top plate 15.

Each of the fuel assemblies shown in the drawings is intended to be arranged, together with three similar fuel assemblies, in a module square in the top plate 21 of a reactor core. The control rod of the module is designated 27.

Figure 2:
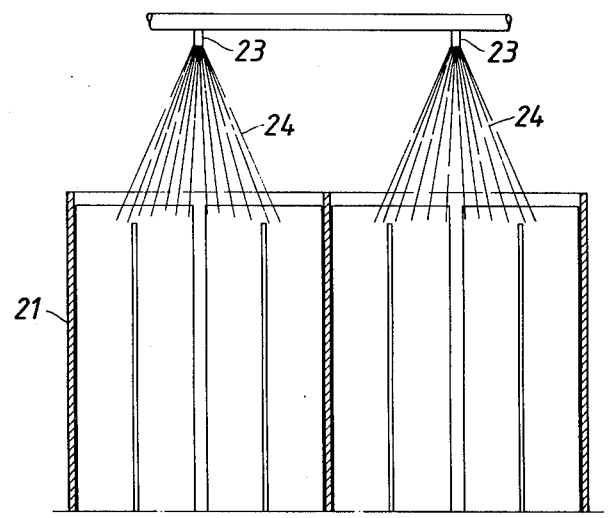

The fuel assembly shown in FIGS. 1-6 is provided with a distribution channel 22 for the sprinkling water which is supplied to the fuel assembly upon emergency cooling of the core. FIGS. 1 and 2 illustrate one case where it is of great importance to construct the fuel assembly with such a distribution channel. A plurality of sprinkling nozzles 23 are arranged, upon emergency cooling, to provide a sprinkling water cone 24 for one core module each. The sprinkling system is designed with respect to undivided fuel assemblies and in such a way that the sprinkling water cone 24 is evenly distributed between the four fuel assemblies of the module. However, when the fuel assembly is divided into four subassemblies, the amount of sprinkling water which is directly supplied to the subassemblies may be very unevenly distributed. In the case shown in FIGS. 1 and 2, thus, certain subassemblies will have no direct supply of sprinkling water at all. In a fuel assembly according to the invention, in such cases a relatively even distribution of the water of the sprinkling system is obtained between all subassemblies, which is obtained by using a water distribution channel.

Figure 5:
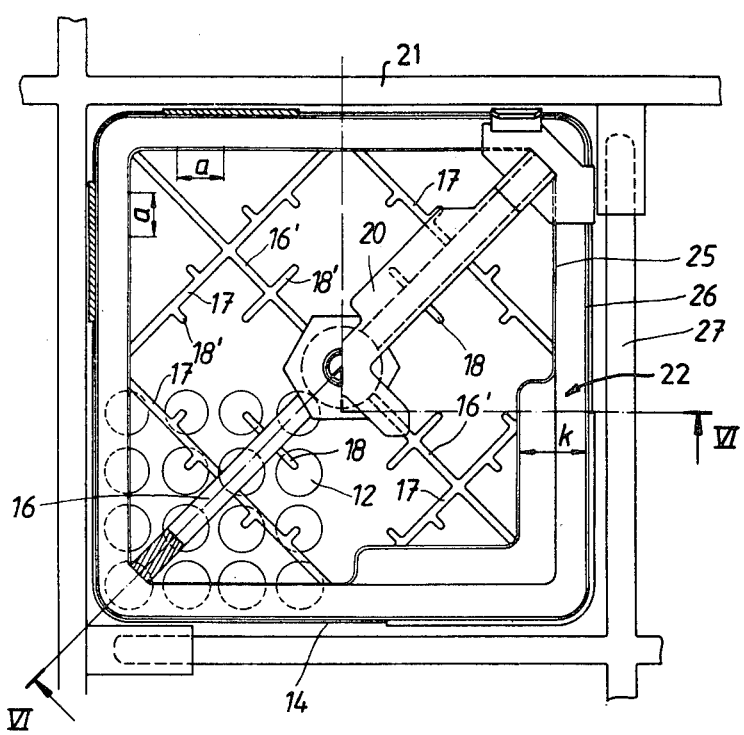

In a water distribution channel 22 shown in FIGS. 1-6 the bottom of the channel is formed by a portion which is integral with the above-mentioned top plate 15, namely by the frame 15'. In addition, the channel is defined by radially inner and radially outer substantially vertical walls 25 and 26, respectively, which are attached to the inner edge and the outer edge, respectively, of the frame 15'. In one of the four corners of the fuel assembly and along a distance which corresponds to at least 10% of the circumference of the fuel assembly, as shown in FIG. 5, the radially inner wall 25 is folded inwards in such a way that the width k at the upper edge of the channel is at least 15%, preferably at least 25%, greater than the average channel width at the upper edge of the channel 22. When arranging the fuel assembly in the reactor core, the fuel assembly is preferably oriented in such a way that the radially inwardly extended portion of channel 22 will have as short a distance as possible to a vertical line through the nearest sprinkling nozzle. See FIGS. 1 and 5.

At corners of the channel 22 which are located diagonally in relation to the corner made with radially inwardly extended portion, the radially inner wall 25 is constructed with overflow portions, the lengths of which in the channel direction are designated a and in which the height of the wall 25 is at least 10% lower than its average height. See FIG. 5.

In case of emergency cooling, part of the sprinkling water will be supplied directly to the water distribution channel, whereafter a considerable part of the water of the channel is supplied via the overflow portions to the partial assembly which is located at the greatest distance from the sprinkling nozzle. Also the two adjacent partial assemblies may need to be supplied with water from the distribution channel, which can be performed through corresponding overflow portions which are constructed for a smaller total water flow to each partial assembly than the above-mentioned overflow portions with the extension a. It is also possible to supply the radially inner wall 25 with through holes in addition to or instead of the above-mentioned overflow portions.

The width k is preferably chosen in such a way that the radially inwardly extended channel portion, made with relatively great width, screens off the corresponding partial assembly from directly supplied sprinkling water to such an extent that this sprinkling water constitutes at the most one-fourth of the total flow of sprinkling water. The water received by said the radially inwardly extended channel portion is then supplied via the remainder of the distribution channel 22 to the partial assemblies which are less favoured as regards direct sprinkling, preferably in such a way that the flow of sprinkling water supplied to the fuel assembly is distributed with approximately one-fourth on each partial assembly.

Figure 8:
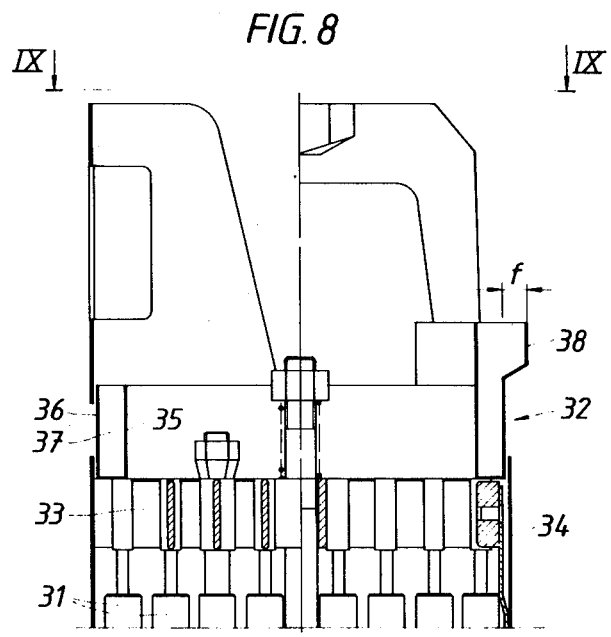
FIG. 8 shows a section along VIII—VIII in FIG. 9.
Figure 9:
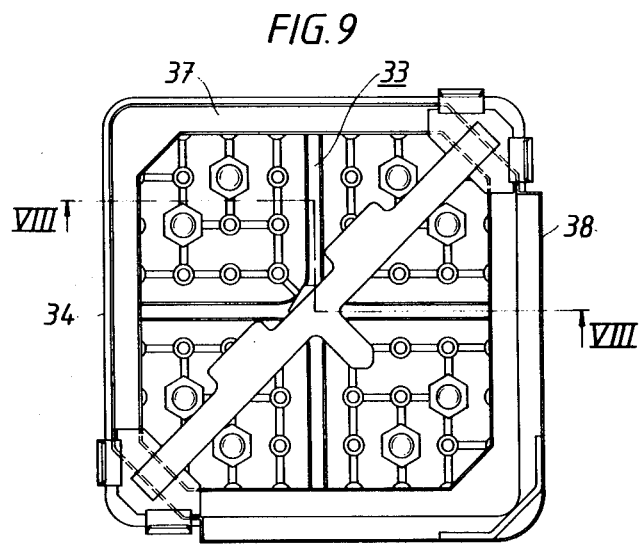
FIG. 9 shows a view from the plane IX—IX in FIG. 8.

On FIGS. 8 and 9, an upper portion of the fuel channel of the fuel assembly is designated 34. This portion surrounds all the fuel rods 31, each of which are inserted with their upper end pins into a through-hole of the top plate 33 of the fuel assembly. The top plate supports a water distribution channel 32 with substantially vertical walls 35 and 36 which, contrary to the corresponding walls shown in FIGS. 5 and 6, are interconnected by means of a bottom portion which is not integrated with the top plate of the fuel assembly, whereby this bottom portion together with the walls 35 and 36 form an internal channel 37 for sprinkling water. The wall 35 is made with vertical wall portions only, but it may also be made with an inwardly-bent portion in the same way as the corresponding wall 25 of the embodiment of the invention shown in FIG. 6. With a lower wall portion the wall 36 makes contact with the inner side of the fuel channel portion 34 with no mentionable play and is attached to the fuel channel by means of a plurality of horizontally directed screws, not shown in the drawing. At at least one of the sides of the fuel assembly, which are intended to face the control rod gap provided for a control rod 27, the wall 36 is made with a corbelled-out or radially outwardly extended portion 38 which protrudes into the control rod gap so that the width f of the corbelled-out portion constitutes at least 20%, preferably at least 30%, of the average width of the channel 37. The portion 38 collects a considerable part of the sprinkling water directed towards the control rod gap, so that also this water may be utilized for cooling the fuel assembly. The horizontal projection of the corbelled-out portion 38 lies substantially outside the fuel channel portion 34 and extends along at least 20% of the channel length. In the same way as the distribution channel 22, the channel 37 may be provided with several water outflows, and the inner channel wall may be bent inwardly along a minor portion of the total length of the channel.

The fuel assembly described in connection with the drawings is only one of many possible embodiments of a fuel assembly according to the invention. Thus, the distribution channel need not be made in the form of a closed loop, but may, for example, be made with only three corners and with two vertical end walls. In certain cases it is possible to achieve an even distribution of cooling water also if the cooling channel is made without overflow paths in the form of slots or holes. The subassemblies may also be constructed in such a way that a fuel channel, which surrounds all the fuel rods of the fuel assembly along their entire lengths, is divided into a plurality of compartments by means of a plurality of wall systems such as vertical partitions which, to a greater or smaller extent, prevent horizontal communication between the compartments, for example as disclosed in U.S. Pat. No. 3,164,530.

What is claimed is:

1. A fuel assembly for a nuclear power reactor, comprising:
   a plurality of groups of vertical fuel rods;
   a plurality of wall systems, each wall system substantially surrounding one of said groups of fuel rods and extending along a greater part of the length of said fuel rods;
   an annular fuel channel portion extending above said plurality of wall systems, a horizontal projection of said annular fuel channel portion surrounding all of the fuel rods of said fuel assembly, said annular fuel channel portion having an inner circumference;
   a substantially horizontal water distribution channel extending above said groups of fuel rods as well as along and adjacent to most of said inner circumference, said water distribution channel being upwardly open and comprising means for receiving emergency cooling water supplied from a location above at least one of said groups of fuel rods and for distributing water so received to at least one of the remaining groups of fuel rods.

2. A fuel assembly according to claim 1, wherein said annular fuel channel portion has a substantially quadratic cross-section; each of said groups of fuel rods is arranged below a corresponding quadrant of said annular fuel channel portion; and said water distribution channel extends along the inner side of said annular fuel channel portion above a plurality of said quadrants, said water distribution channel in at least one quadrant comprising at least one water outflow for water to the corresponding group of fuel rods.

3. A fuel assembly according to claim 1, wherein said water distribution channel comprises a radially inner channel wall, a portion of which is inwardly-bent in such a way that the radial width of said water distribution channel at the upper edge of said inwardly-bent portion is at least 15% larger than the average channel width at the upper edge of the channel.

4. A fuel assembly according to claim 1, wherein said fuel assembly comprises a top plate arranged above said groups of fuel rods and said water distribution channel comprises a bottom portion at least a part of which comprises a peripheral portion of said top plate.

5. A fuel assembly according to claim 1, wherein said distribution channel comprises a wall portion which in use of said fuel assembly faces a control rod gap, said wall portion comprising a radially outwardly extended portion, the horizontal projection of said radially outwardly extended portion protruding substantially outside said horizontal projection of said annular fuel channel portion.

* * * * *